Oct. 7, 1969   R. H. STUDEBAKER   3,471,234
LASER BEAM PROJECTOR FOR SURVEYING OPERATIONS
Filed June 8, 1966   4 Sheets-Sheet 1

INVENTOR.
ROBERT H. STUDEBAKER
BY W. A. Schaich &
Thomas A. Meehan
ATTORNEYS

Oct. 7, 1969  R. H. STUDEBAKER  3,471,234

LASER BEAM PROJECTOR FOR SURVEYING OPERATIONS

Filed June 8, 1966  4 Sheets-Sheet 4

INVENTOR.
ROBERT H. STUDEBAKER
BY W. A. Schaich &
Thomas A. Meehan
ATTORNEYS

United States Patent Office 3,471,234
Patented Oct. 7, 1969

3,471,234
LASER BEAM PROJECTOR FOR SURVEYING
OPERATIONS
Robert H. Studebaker, Dayton, Ohio, assignor to Process
Equipment Company of Tipp City, Inc., a corporation
of Ohio
Filed June 8, 1966, Ser. No. 556,018
Int. Cl. G01c 3/00, 5/00, 1/00
U.S. Cl. 356—3                                    8 Claims

ABSTRACT OF THE DISCLOSURE

This invention provides a method and apparatus for performing precise surveying operations relative to a selected reference point by utilizing a laser beam. A portable laser beam reference plane generator is provided which may be set up in precise alignment with a selected reference point and which produces a rotating laser beam sweeping over the adjacent terrain. The generator may be accurately adjusted to permit both elevation and angular displacements to be measured at any point within the area traversed by the rotating laser beam.

Figure 1:
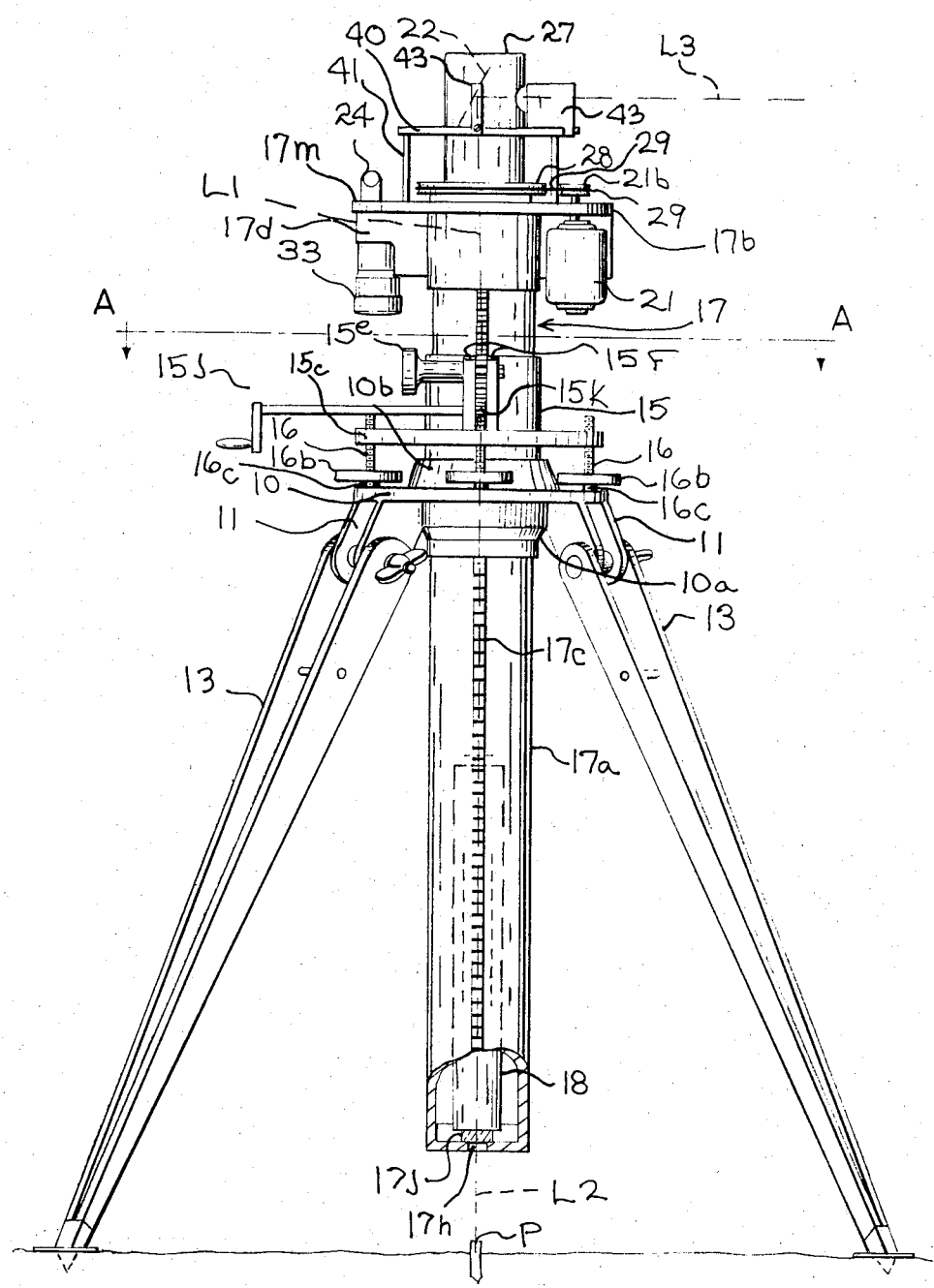

This invention relates to a precision surveying apparatus employing a laser beam as a reference plane, which plane may be horizontal or at any desired angle relative to the horizontal, and more particularly, to a portable laser beam reference plane generator which may be set up in precise alignment with a selected reference point on any type of terrain and conveniently and accurately adjusted to produce a laser beam rotating about an axis passing through such reference point.

In my copending application Ser. No. 468,821, filed July 1, 1965, now abandoned, and assigned to the assignee of this application, I have disclosed and claimed a method and apparatus for utilizing a generated laser beam sweeping through a preselected reference plane for determining the relative elevation with respect to the reference plane of any ground surface point within the effective range of such laser beam. As pointed out in such copending application, such system greatly facilitates surveying operations and may also be utilized to simultaneously control earth working operations of a plurality of grading machines, scrapers, mining equipment, or the like, each of which being provided with laser beam detector means and suitable control arrangements responsive to the laser beam for adjusting the elevation of the implement to maintain such implement at a preselected displacement relative to the laser beam reference plane, irrespective of the terrain variations.

In my copending application Ser. No. 474,684, filed July 26, 1965, now abandoned, and assigned to the assignee of this application, I have disclosed a specific structure for a tripod-mounter laser beam generator. I have now developed certain improvements in such construction which provide even greater convenience and accuracy in operating such laser beam generator and further permits the resulting laser beam to be utilized to not only determine elevation in surveying operations but also permits angular displacements to be accurately laid out or measured over any type of terrain.

More particularly, it is an object of this invention to provide a portable laser beam generator capable of producing a laser beam rotating about an axis characterized by the fact that the rotatable axis of the laser beam may be precisely aligned with a ground reference point.

Another object of this invention is to provide an improved method of surveying utilizing a rotating or oscillating laser beam.

A further object of this invention is the provision of a rotatable laser beam generator wherein a shadow may be produced in the beam at any one or more of a plurality of precise angular locations around the rotational axis of the laser beam, thereby permitting the measurement or layout of angular displacements about the axis of the rotating laser beam.

Still another object of this invention is to provide a laser beam generator of the type producing a laser beam rotating in a plane, characterized by the provision of accurate mechanism for tilting the plane defined by the laser beam to assume a desired inclination with respect to the axis of rotation of the laser beam.

Other and further objects and advantages of this invention will become apparent to those skilled in the art from the following detailed description thereof, taken in conjunction with the annexed sheets of drawings on which a preferred embodiment of this invention is illustrated.

Figure 5:
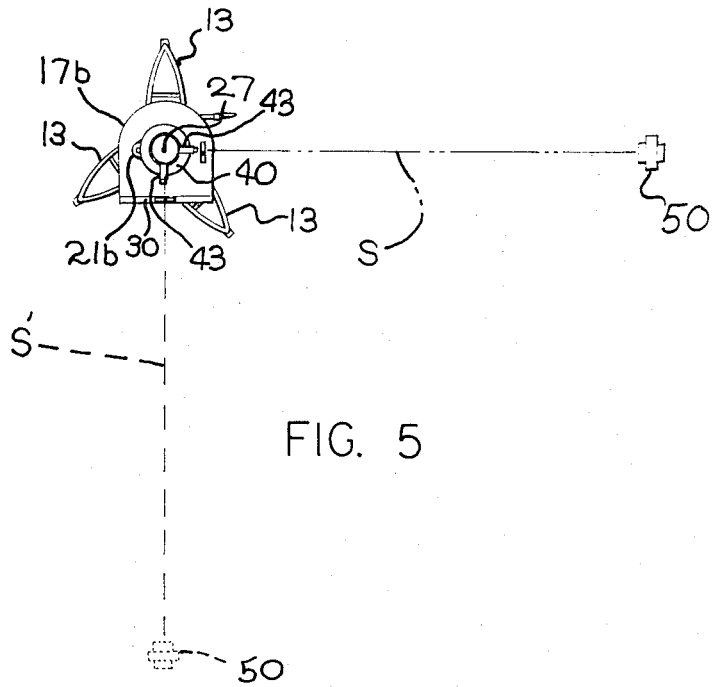
Figure 2:
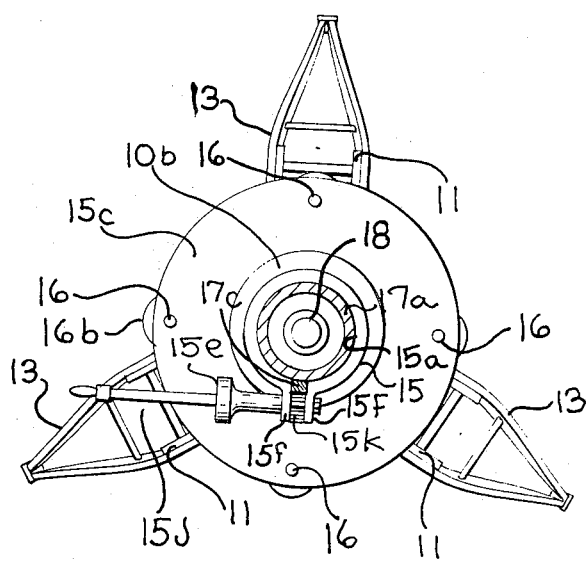
Figure 3:
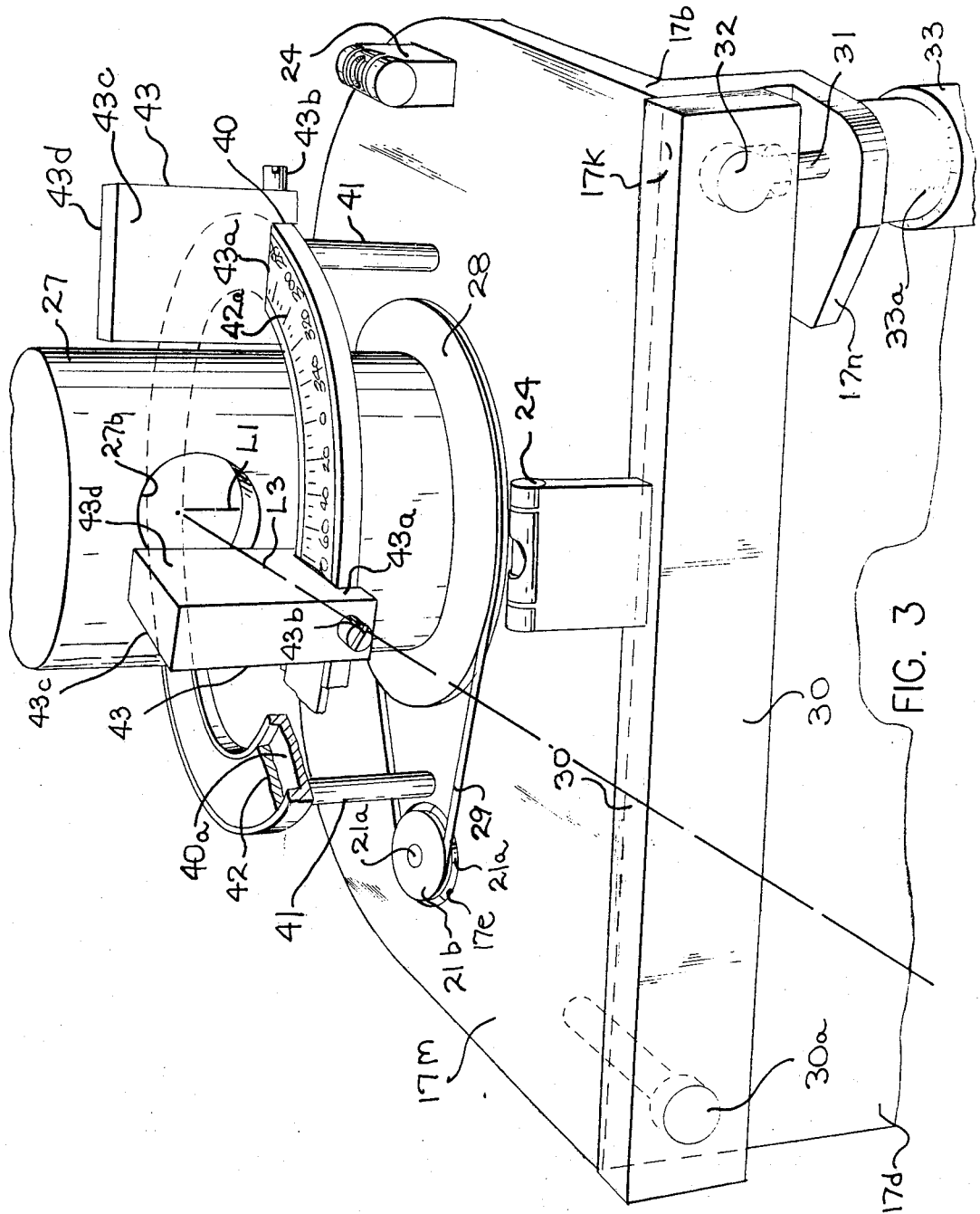
Figure 4:
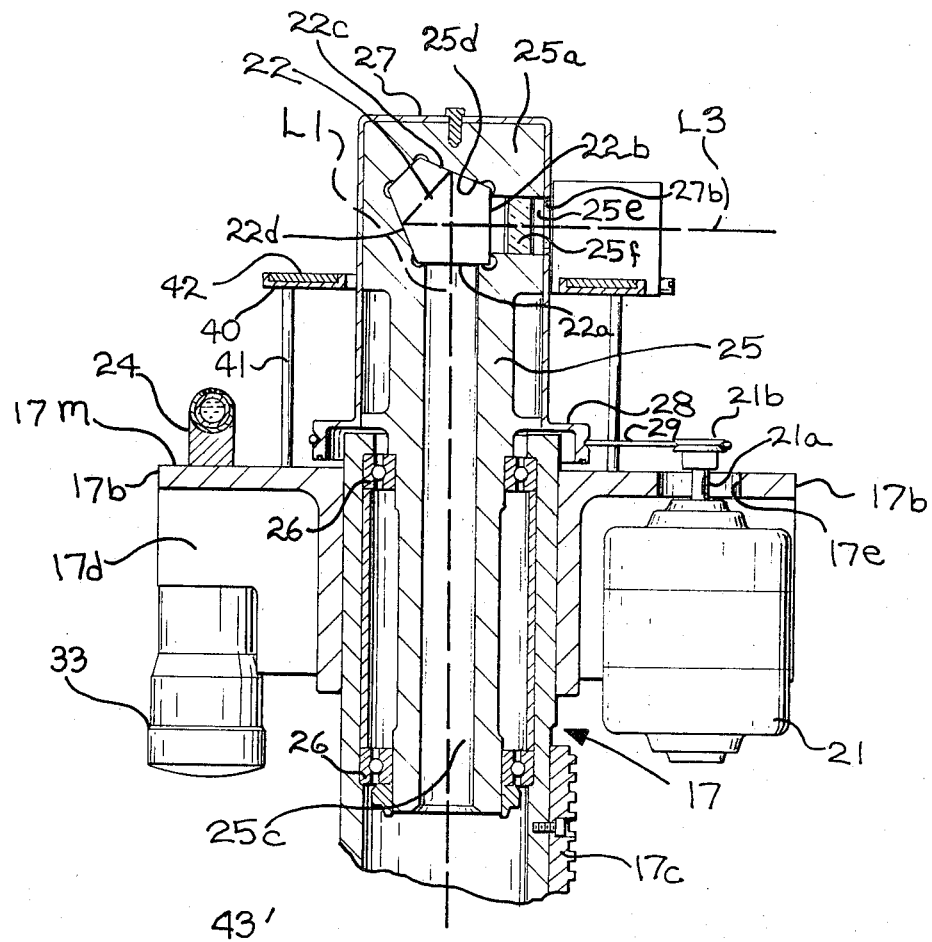
Figure 6:
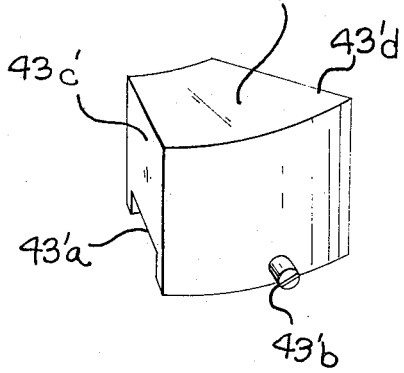

On the drawings:
FIG. 1 is a side elevational view of a planar laser beam generator constructed in accordance with this invention.
FIG. 2 is a sectional view taken on the plane A—A of FIG. 1.
FIG. 3 is an enlarged scale perspective view of the top portion of the laser beam generator of FIG. 1.
FIG. 4 is a partial vertical sectional view of the top portions of FIG. 1.
FIG. 5 is a schematic plan view illustrating the utilization of the laser beam generator of FIG. 1 in a surveying operation for accurately determining angular displacements.
FIG. 6 is a perspective view of a modified beam blocking member.

As shown on the drawings:
All of the elements of the laser beam generator shown in FIG. 1 which appear below the section line A—A are functionally identical to those disclosed and described in detail in my said copending application Ser. No. 474,684, filed July 26, 1965 and hence reference should be had to that application for a more detailed description of these elements. Briefly, there is provided a primary base or support member 10 which is of a circular platelike configuration and has a plurality of depending mounting brackets 11 welded around the periphery thereof to provide a pivotal mounting for the bifurcated ends of tripod legs 13. In this manner, primary base 10 may be supported by the tripod legs 13 in a roughly horizontal position on any terrain. Base 10 is further provided with a central depending circular boss 10a welded thereto and a similar boss 10b, formed in two semicircular pieces is secured to the top surface of primary base 10 by a plurality of bolts (not shown). Bosses 10a and 10b are centrally apertured and together define a spherical segment internal bearing surface (not shown).

A secondary base element 15 is provided which constitutes a vertically extending hollow member. The lower end of secondary base member is enlarged and ground to produce an external spherical segment bearing surface (not shown) which is cooperable with the interior spherical bearing surface of the primary base member 10 to adjustably mount the secondary base element in a generally vertical position relative to the primary base 10.

Near the middle portion of the secondary base element 15, a radially projecting integral flange 15c is provided which overlies the primary base 10 beyond the perimeter of boss 10b. At equally spaced locations around the perimeter of flange 15c, a plurality of threaded apertures are provided which respectively receive the threaded ends of depending adjusting pins 16. The adjusting pins 16 are each provided with an enlarged hand grasping collar 16b and a flat head portion 16c which contacts the top surface of primary base 10. It is therefore apparent that the adjusting pins 16 permit the vertical position of secondary base 15 to be accurately pivotally adjusted relative to the primary base or support 10 to assume either a true vertical position or a position at any desired inclination relative to the vertical, as indicated by means that will be hereafter described.

The top portion of secondary base 15 is axially slit to define two opposed clamping flanges 15f and a hand actuated clamping bolt 15e is provided to draw such clamping flanges 15f together. Additionally, a spur gear 15k is journaled between flanges 15f and is rotatable by a hand crank 15j for a purpose to be described.

As previously mentioned, secondary base element 15 is hollow and defines a vertically extending cylindrical bore 15a (FIG. 2) extending completely through the secondary base element. A tubular support or housing 17 is provided having a cylindrical portion 17a which is snugly but slidably insertable in the cylindrical bore 15a of the secondary base element 15. An axially extending rack gear 17c is secured to the outer wall of tubular support 17 and passes through flanges 15f and cooperates with spur gear 15k. A suitable axial slot (not shown) is provided in the secondary base element 15 to accommodate the rack gear 17c.

It is therefore apparent that the relative vertical position of the housing 17 with respect to the secondary base element 15 may be conveniently adjusted by rotating hand crank 15j and the housing 17 may then be locked in any selected vertical position relative to the secondary base 15 by tightening the clamping bolt 15e. Such adjustment, however, does not produce any deviation of the axis of tubular housing 17 relative to the axis of the bore of the secondary base element 15, hence, in any selected vertical position, the axis of the housing 17 is shifted relative to the vertical by manipulation of the adjusting pins 16.

In the lower portions of the tubular housing 17, a conventional laser beam source 18 is suitably mounted so that a collimated primary beam L1 produced by such laser source is upwardly directed and is coaxially aligned with the axis of housing 17. The laser beam source 18 may comprise any conventional gas laser such as the Model No. 5200 currently manufactured and sold by Perkin-Elmer Corporation of New Britain, Conn. The housing 17 is preferably formed from aluminum or any other metal which will shield the laser source 18 from ambient electrical disturbances and which will readily dissipate the heat generated by the laser source 18. Laser source 18 may be actuated by any source of electrical energy producing the required voltage and power.

I have observed that such laser beam sources actually produce two oppositely directed beams, one beam being, of course, the primary beam L1 and having the maximum intensity, but a secondary beam indicated at L2 (FIG. 1) is also emitted from the other end of such source in alignment with the primary beam L1. Secondary beam L2 is of substantially reduced intensity, yet quite visible to the eye of an observer. In accordance with this invention, the secondary laser beam L2 is utilized to assure the precise vertical alignment of the primary beam L1 with a selected ground reference point P. This can be very conveniently accomplished by providing a central aperture 17h in the bottom of housing 17 and covering such aperture with a transparent window 17j of glass or a plastic material that will readily transmit the laser beam L2.

Referring now particularly to FIG. 3, it will be observed that the top portion of the tubular housing 17 is provided with a radial enlargement indicated at 17b having a depending flange 17d along one side. An electric motor 21 is mounted on flange 17d in depending relationship to the enlargement 17b and has its shaft 21a projecting through an aperture 17e (FIG. 4) in the enlargement 17b and mounts a pulley 21b thereon. Within the top portions of the bore of housing 17 an elongated hollow hub 25 is rotatably journaled by suitable bearings 26. The upper portions of hub 25 project above the radial enlargement 17b and the top end 25a of hub 25 is solid. An inverted, cup-shaped cover 27 is mounted over the projecting portions of hub 25 and secured thereto by a bolt 27a. On the bottom edge of cover 27, a pulley 28 is welded and a belt 29 connects pulley 28 to the motor driven pulley 21b.

Near the top of hollow hub 25 an optical reflecting device 22 is mounted which is arranged to receive the upwardly directed primary laser beam L1 passing through the hub bore 25c and to reflect such beam in a fixed angular relationship to the direction of the incident beam, for example, at exactly 90° to the direction of the incident laser beam L1. Thus, the reflected beam L3 will be positioned in a fixed angular relationship, preferably 90°, with respect to the axis of tubular housing 17 and the bore axis of the secondary base element 15. Optical device 22 could be an accurate mirror positioned at a precise 45° angle with respect to the incident laser beam L1, but preferably comprises a device known as a pentaprism, one type of which is currently manufactured and sold by Brunson Instrument Company of Kansas City, Mo. and has the property of reflecting any incident light beam at exactly 90° to the direction of the incident beam. Hence any eccentricity in the rotation of the hub 25 due to bearing wear or misalignment will not change the angular relationship of the reflected beam L3 relative to the primary beam L1.

In the specific embodiment shown in the drawings, the hollow hub 25 is provided near its top with a recess 25d communicating with the hub bore 25c and corresponding in shape to the shape of the pentaprism 22. The recess 25d opens through the wall of the hub 25 so that the pentaprism 22 may be slidably but snugly inserted in such recess. A cover plug (not shown) is then inserted in the recess 25d to hold the pentaprism 22 in position.

The pentaprism is of roughly pentagonal shape and is formed from optical quality glass. One side 22a of the pentaprism receives the incident laser beam L1 and another side 22b, which is perpendicular to the first side 22a, transmits the reflected laser beam L3. The other two opposed angular sides 22c and 22d of the pentaprism have a mirror coating applied to their outer surfaces, and these sides are accurately ground so that the incident beam L1 is internally reflected in the pentaprism 22 to follow the path indicated by the dotted lines to produce the final output beam L3, which will always be at exactly 90° to the direction of the incident beam L1. The hub 25 is, of course, provided with a radial aperture 25e to permit the reflected beam L3 to pass out of the hub. The cover 27 is provided with a suitable aperture 27b in its side wall aligned with the radial hub opening of 25e, and hence with the path of the reflected laser beam L3. Aperture 25e may be covered by a suitable inserted window 25f of glass or transparent plastic as desired.

The top surface 17m of the housing enlargement 17b is accurately ground to be precisely normal to the axis of housing 17, hence normal to the primary laser beam L1. A pair of mutually perpendicularly disposed fluid bubble level indicators 24 are then mounted on, or in a selected angular relationship with the ground top surface 17m and the indicating bubbles of such level indicators may be utilized to indicate when the surface 17m is exactly horizontal with respect to gravity or in a selected angular relationship therewith.

In accordance with this invention, one of the level indicators 24 is mounted on a sine bar 30. The sine bar 30 is snugly pivotally mounted at one end on a pivot bolt 30a which is threaded into the depending flat side 17d of the enlargement 17b. The other end of the sine bar is raised or lowered relative to the top surface 17m of housing enlargement 17b by a micrometer actuated rod 31 which abuts against a transverse pivot pin 32 journaled in the sine bar 30. A projecting bracket 17n is formed on the housing side 17d and such bracket is traversed by the micrometer rod 31 and mounts in depending relationship a conventional micrometer adjusting mechanism 33. Mechanism 33 is provided with conventional calibrations 33a which are graduated to indicate the angular displacement of the sine bar 30 relative to the ground top surface 17m, preferably in conventional surveying units of .01 ft. vertical elevation per 100 ft. of horizontal distance. Accordingly, the sine bar 30 may be adjusted by micrometer mechanism 33 to a zero position where the top surface 30b of the sine bar 30 is exactly parallel to the ground surface 17m of the housing enlargement 17b, or may be angularly displaced upwardly or downwardly relative to the ground top surface 17m (hence, relative to the axis of rotation of the laser beam L3) by a precise angular amount by operation of the micrometer mechanism 33.

The last improvement accomplished by this invention involves the provision of a support ring 40 which surrounds cover 27 and is positioned in coaxial relationship with respect to the axis of housing 17, hence in coaxial relationship with respect to the primary laser beam L1. Ring 40 is supported in parallel relationship to the top surface 17m by a plurality of posts 41 which are suitably secured to the ring 40 and to the top surface 17m of the housing enlargement 17b. The ring 40 is of shallow U-shaped configuration, thereby defining an annular track or channel 40a (FIG. 3). An indicating ring 42 is snugly but rotatably mounted in the channel 40a. Ring 42 is provided with angular graduations 42a on its top surface.

In accordance with this invention, one or more beam blocking members 43 are provided which may be detachably secured to the ring 40 at any desired horizontal angular position relative to the axis of the primary laser beam L1, assuming such laser beam to be vertical. Beam blocking members 43 are provided with a properly shaped recess 43a in their bottom portions to permit such members to be snugly but slidably supported on the ring 40. A radially disposed clamping screw 43b permits each block 43 to be locked to ring 40 at any desired angular position about the ring 40.

Preferably, one of the beam blocking members 43 is constructed to have a transverse width in the plane of the rotating laser beam L3 equal to the corresponding width or diameter of the laser beam L3. The radial sides 43c and 43d of each beam blocking member 43 are exactly radial with respect to the rotational axis of the laser beam L3. If desired, additional beam blocking members 43' (FIG. 6) may be provided whose cross-sectional configuration in the plane of the rotating laser beam correspond exactly to a fixed angle. In the case of the illustrated beam blocking member 43', the angle is 90°.

The improvements in the laser beam generator heretofore described contribute substantially to the flexibility and utility of the laser beam generator. For example, in all surveying operations, or operations involving the control of earthworking or analogous equipment by a laser beam, there has to be first located in the working area one or more reference points whose elevation is precisely known. These reference points are commonly indicated by a stake driven into the ground with an X on the top of the stake indicating the precise reference point. It is, of course, desirable that the rotating laser beam L3 be aligned so that its axis of rotation passes precisely through the desired reference point. This is accomplished with the utmost dispatch by permitting the secondary laser beam L2 to project out of the bottom of housing 17 to impinge on the stake. Hence in setting up the lase beam generator, the transit legs will be adjusted so that the secondary laser beam L2 is observed to be incident upon the center point of the reference marking on the top of the reference stake.

In many surveying operations, it is desirable that a horizontal line be laid out at an exact angular relationship relative to another line. This may be conveniently accomplished by the beam blocking members 43.

Referring to FIG. 5, let us assume that it is desired to lay out a line extending from the reference point P at exactly 90° to another line passing through the reference point. A beam receiving surveying rod 50, of the type described in detail in my copending application Ser. No. 532,944, filed Mar. 9, 1966 and assigned to the assignee of this application, is then set up at any desired distance away from the reference point along the known line and vertically adjusted to receive the laser beam L3. One of the beam blocking members 43 is then moved around ring 40 until the signal generated by the receiver on surveying rod 50 is interrupted. At this position the surveying rod 50 lies exactly in the shadow of the beam produced by the beam blocking member 43. Such member 43 is locked in this position on ring 40 by screw 43b. The second beam blocking member (or the first one, if desired) is then positioned exactly 90° away from the position of the first blocking member, as indicated by the graduations 42a. The surveying rod 50 is then moved by the rodman until it lies in the beam shadow S' produced by the second beam blocking member 43, and the line drawn between the reference point and the second location of the rod 50 will be exactly 90° with respect to the known line. Of course, instead of utilizing two beam blocking members 43, the single beam blocking member 43' having an angular extent of 90° could be mounted on the support ring 40. Other utilizations of the beam blocking members for detecting or laying out horizontal angular relationships will be readily apparent to those skilled in the art.

At any time it is desired to move the rotating laser beam L3 in a plane that is inclined by a known amount of degrees relative to the horizontal, the sine bar 30 and micrometer adjusting mechanism 33 may be employed. It is only necessary to set up the laser beam generator so that the sine bar 30 is generally perpendicular to the horizontal axis about which the tipping of the resulting laser beam plane is desired. Micrometer mechanism 33 is then actuated to displace the sine bar 30 by the desired amount of angular inclination. Thereafter, the adjusting pins 16 are operated to bring both bubble level indicators 24 to their level indicating positions. The resulting plane through which the rotating laser beam L3 is swept will then be exactly parallel to the top surface 30a of the sine bar 30, and hence will be inclined relative to the horizontal by the amount indicated by the setting of micrometer mechanism 33.

It will be understood by those skilled in the art that many of the terms utilized in this specification and claims are relative. Thus, in describing the invention, emphasis has been directed to conventional surveying operations wherein the rotating beam is moving in either a horizontal plane or a plane inclined at a slight angle to the horizontal. Laser beam generators embodying this invention may be applied to effect surveying measurements or utilized as a surveying reference plane for structures or operations requiring a vertical reference plane. In this case, the axis of rotation of the rotating laser beam would be generally horizontal, and supports other than the conventional tripod legs would have to be provided for the primary base member 10. Furthermore, for lack of an adequate generic term, I have employed in the claims the term "surveying reference apparatus." A device embodying this invention may obviously be utilized for setting up a laser beam reference plane for surveying operations, but the same plane may be advantageously utilized for controlling the vertical movements of the working tool of various types of earthworking implements; hence, the term "surveying reference" is intended to include all utilizations of the reference plane established by the rotating laser beam.

It is therefore apparent that a laser beam generator incorporating the described improvements may be quickly, conveniently and accurately set up on any terrain and conveniently adjusted to produce a laser beam rotating or oscillating about an axis which may be exactly aligned with a known reference point. The elevation of the resulting laser beam plane may be conveniently adjusted and the inclination of the resulting laser beam plane relative to the horizontal may be accurately and conveniently adjusted to any desired angular relationship. Lastly, angular displacements may be laid out, or the angular distance between two unknown points on the terrain relative to a reference point may be quickly and accurately determined.

As will be evident to those skilled in the art, modifications of this invention can be made in the light of the foregoing disclosure without departing from the scope of the appended claims.

I claim:
1. Laser beam surveying apparatus comprising:
   (1) means for rotating a laser beam about a vertical reference axis;
   (2) an annular ring supported in coaxial relationship with said reference axis and axially spaced from the laser beam;
   (3) At least one beam-blocking member mountable on said ring in any selected angular position thereon, said beam-blocking member intersecting said laser beam and having a width dimension in the plane traversed by the laser beam at least equal to the width of the laser beam, thereby creating a void in the resulting laser beam reference plane at any selected angular position about said reference axis; and
   (4) arcuate scale means for indicating the angular position of said beam-blocking member.

2. The apparatus defined in claim 1 wherein said arcuate scale means comprises a second ring bearing degree graduations, said second ring being rotatable relative to said first mentioned ring and coaxial therewith.

3. Apparatus for surveying angular relationships about a ground reference point comprising:
   (1) means for rotating a laser beam about a vertical axis passing through the ground reference point;
   (2) a horizontal annular ring supported in coaxial relationship with said vertical axis and vertically spaced from the laser beam;
   (3) at least one beam blocking member mountable on said ring in any selected angular position thereon, said beam blocking member intersecting said laser beam and having a cross-sectional configuration in the plane traversed by the laser beam corresponding to the desired angle, thereby creating an angular void in the resulting laser beam reference plane at any selected angular position about the ground reference point.

4. A method of utilizing a laser beam as a surveying reference comprising the steps of:
   (1) selecting a reference point in the area to be surveyed;
   (2) positioning a laser beam source, of the type producing two oppositely directed laser beams, in a position where the beams are vertical and the downwardly directed one of said beams impinges on said reference point;
   (3) reflecting the upwardly directed beam at a known angle to the vertical; and
   (4) detecting the reflected beam at a point horizontally spaced from said reference point.

5. The method defined in claim 4 wherein said reflected laser beam is continuously rotated or oscillated about the vertical axis of the originally generated laser beam, thereby defining a surveying reference plane having a known elevational relationship to said reference point.

6. A laser beam generator comprising a primary support structure, a laser beam source producing two oppositely directed laser beams, a hollow tubular housing constructed and arranged to receive said laser beam source therein with said laser beams respectively directed parallel to the housing axis, means for mounting said housing on said support in a generally vertical position, said last mentioned means including means for angularly adjusting the position of said housing to precisely position both laser beams in a true vertical position, whereby the downwardy directed beam impinges on the ground or other reference surface to permit vertical alignment of the downwardly directed beam with a desired reference point, an optical device capable of reflecting an incident laser beam at a known angle, means for rotatably mounting said optical device in the path of said upwardly directed laser beam, whereby rotation or oscillation of said optical device causes the reflected laser beam to sweep through a plane at a known angle to the true vertical.

7. The apparatus of claim 6 plus means for adjusting the vertical position of said optical device relative to said primary support.

8. Laser beam surveying apparatus comprising: (1) means for rotating a laser beam transversely about a vertical reference axis; (2) a beam-blocking member; (3) means for positioning said beam-blocking member to intercept said beam at any selected angular position around said vertical axis, thereby creating a void in the resulting laser beam reference plane at any selected angular position about said reference axis.

References Cited

UNITED STATES PATENTS

| | | | |
|---|---|---|---|
| 368,308 | 8/1887 | Richardson | 33—72 |
| 1,922,791 | 3/1930 | Bumpus. | |
| 2,661,653 | 4/1951 | Castiglia | 88—2.2 X |
| 3,266,014 | 8/1966 | Leotta | 240—49 X |
| 3,279,070 | 10/1966 | Blount et al. | 33—46.2 |
| 3,335,285 | 8/1967 | Gally et al. | |

RONALD L. WIBERT, Primary Examiner

J. ROTHENBERG, Assistant Examiner

U.S. Cl. X.R.

33—72; 331—94.5; 356—138